May 7, 1940.  J. P. LANNEN  2,199,667
WORK CARRIER FOR BALANCING MACHINES
Filed Feb. 9, 1938  2 Sheets-Sheet 1

Inventor
Joseph P. Lannen
J. S. Murray
Attorney

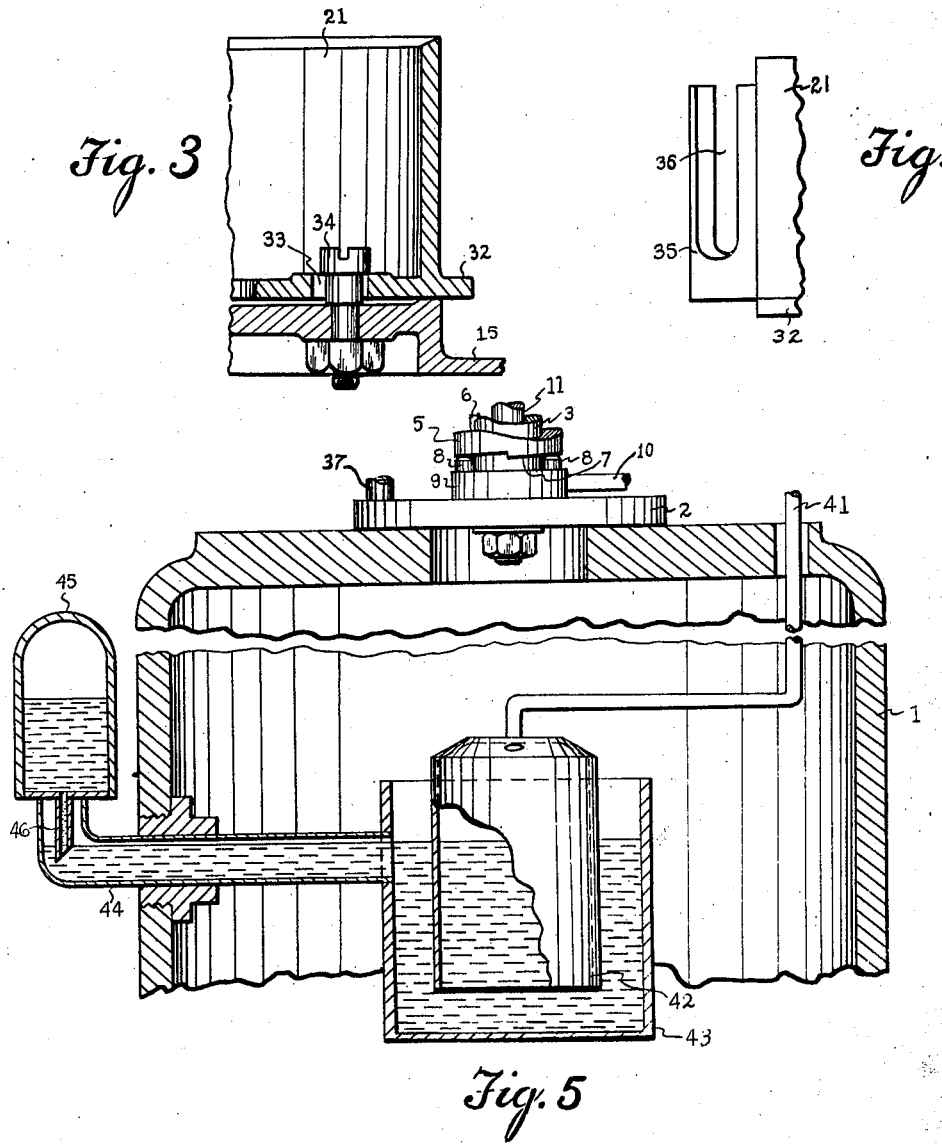

Patented May 7, 1940

2,199,667

UNITED STATES PATENT OFFICE 2,199,667

WORK CARRIER FOR BALANCING MACHINES

Joseph P. Lannen, Detroit, Mich.

Application February 9, 1938, Serial No. 189,606

14 Claims. (Cl. 73—53)

This invention relates to balancing machines, and particularly to work carriers for such machines.

In the operation of a balancing machine for testing tires, ring gears, flywheels, or the like, it is initially necessary to accurately center such work on a universally pivoted carrier, at the vertical axis established by the pivot of such carrier. Flywheels and like objects requiring balancing are usually formed with either a central hub or shaft-receiving opening, readily engageable by a positioning element. The proper positioning on the carrier of annular objects, and especially large annular objects is considerably more difficult, this being particularly true of pneumatic tires, since these, when unmounted, vary considerably from a true circular form, and hence require an alteration of shape as well as centering on the carrier.

An object of the invention, therefore, is to equip the work carrier of a balancing machine with improved means for centering a circular object and particularly one of annular form, and for shaping work of a yieldable nature, such as rubber tires, to true circular form.

Another object is to equip the carrier of a balancing machine with work-clamping shoes and a common means for actuating such shoes, and to so mount the shoes and their actuator that an actuation will not disturb the proper balance of the carrier.

Another object is to adapt such shoes to be readily replaced by larger or smaller ones to accommodate different sizes of work.

Another object is to adapt the shoes to be quickly and easily operated in unison by a cam and lever mechanism, without disturbing the proper balance of the work carrier.

A further object is to provide an easily read system of radial markings on the clamping shoes, and to align such markings with similar ones on a universal level centrally mounted on the carrier, whereby an indication afforded by such level may be readily and accurately applied to a tire or other object positioned by the shoes.

A further object is to provide means for effecting a comparatively permanent adjustment on a balancing machine before it is put to use, to correct any initial lack of balance of the work carrier.

A still further object is to equip such a machine with a provision for damping the oscillations of the work carrier, in use thereof.

These and various other objects are attained by the construction hereinafter described and illustrated in the accompanying drawings, wherein:

Fig. 3 is a vertical sectional detail, taken on the line 3—3 of Fig. 1, and showing one of two bolts normally preventing upward removal of the shoes from the carrier.

Fig. 4 is a vertical sectional detail, taken on the line 4—4 of Fig. 1, and showing particularly a provision on the shoes, for engaging the inflation stem of a tire air tube.

Fig. 5 is an axial vertical sectional view of the hollow base of a balancing machine, showing particularly a provision within such base for damping the oscillations of the work carrier of the machine.

Figure 1:
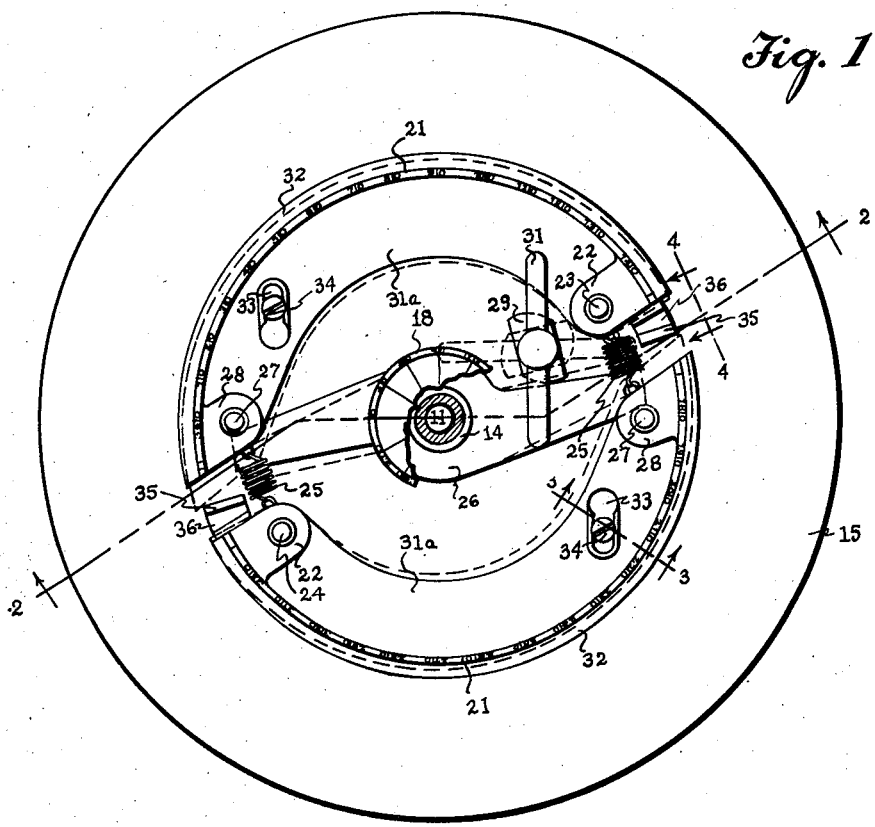
Fig. 1 is a top plan view of the work carrier of the improved machine, showing in dash lines the released position of the clamping shoes.

In these views the reference character 1 designates the hollow cylindrical base of a balancing machine, and 2 a mounting plate centrally surmounting the base and rigidly carrying a hollow or outer post 3 having an exterior annular flange 4 at its top. A sleeve 5 is mounted upon such post for a limited vertical sliding travel and is keyed thereto as indicated at 6, to prevent rotation of such sleeve. Vertical actuation of the sleeve is accomplished by any convenient means, such as by machining the bottom face of the sleeve 5 to form two semi-circular spiral cam faces 7, resting on pins 8, carried by a collar 9, rotative on the post and resting on the mounting plate 2. A handle 10 projects from such collar, for rotating the same, so that the pins may take effect on said cam faces.

Positioned within and projecting above the post 3 is an inner post 11 adapted to seat a ball 12, serving as a universal pivot member for a work carrier. Thus said ball has a pressed fit within the recessed lower portion of a plug 13, threaded or otherwise fixed within a hub 14, welded or otherwise rigidly secured to the center of a circular carrier plate 15. A ring 16, of hard material, encircling the post 3, is interposed between said sleeve 5 and the hub, and is rigidly secured to the latter, such ring engaging beneath the flange 4 to limit the upward actuation of the ring and work carrier by the sleeve 5.

A hollow pedestal 17, threaded or otherwise rigidly mounted on the upper end of the hub, is flanged at its top to seat a universal level 18, having radial markings on its top face to identify the direction of unbalance.

A pair of substantially semi-circular clamping shoes 21, integrally carrying horizontally slotted lugs 22, are arranged in complementary relation and pivoted at relatively remote ends on pins 23 and 24, engaging said lugs and rigidly upstanding from the carrier plate. The free end of each shoe is connected to and urged toward the pivoted end of the companion shoe, by a coiled spring 25. Centrally journaled on the hub 14 and seating on a shoulder thereof, is a double-armed lever 26, terminally engageable with pins 27 carried by lugs 28, integrally projecting from the free ends of the shoes and horizontally slotted to accommodate said lever. For actuating such lever, a cam 29 is rigidly secured on the lower end of a vertical shank 30, the lower portion whereof forms a socket to receive a pin 30a rigidly rising from the carrier plate 15, the upper end of said shank being provided with a handle 31. The upper edges of the shoes 21 carry sets of radial markings, which correspond to the radial markings of the level and are substantially aligned with the level markings when the shoes occupy their work-engaging positions.

Figure 2:
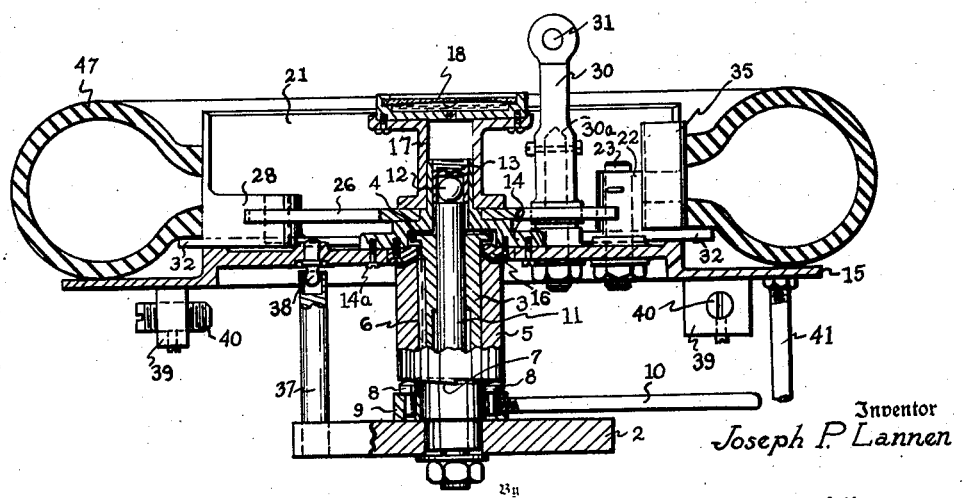
Fig. 2 is an axial vertical sectional view of the carrier and its pivotal support, taken on the line 2—2 of Fig. 1.

Each of said clamping shoes is formed on its outer face with a flange 32 extending from end to end thereof, to aid in centering and supporting objects, such as that shown in Fig. 2, where this flange supports one of the shoes of a tire casing. A flange 31a, extends inwardly from end to end of each shoe, and is formed with a keyhole slot 33, accommodating a headed bolt 34, secured to the carrier plate. Also, integrally formed on the pivoted end of each clamping shoe is a circumferential projection 35 formed with a downwardly opening slot 36, occupying a radial relation to the carrier.

An anchoring post 37, threaded into or otherwise fixed on the mounting plate 2 and upwardly projecting therefrom, is socketed at its upper end to receive a ball-shaped head 38 on a pin fixed in the carrier plate 15, to prevent rotation of the latter. A pair of lugs 39, rigidly carried by and beneath the carrier plate at diametrically opposed points thereof, carry transversely adjustable threaded weights 40, held in adjusted positions by set screws or the like. Such weights aid in balancing the carrier, since it is necessary that the carrier and all parts carried thereby, be in universal balance.

A rod 41 or the like, rigidly secured to and downwardly projecting from the carrier plate extends freely through the top of the base, and rigidly carries within the latter a cylinder 42, closed at its upper and open at its lower end, and normally centered in the vertical axis of the machine. Said cylinder is submerged in oil or the like within an open-topped container 43, and a pipe 44 supports such container from a wall of the base. Preferably said pipe further serves to supply oil to the container 43 from a bottle 45 located exteriorly to the base and having an outlet tube 46 projecting downwardly to maintain the oil at a constant level.

In operating the described machine, the clamping shoes while in their released position are engaged by a tire or other annular object 47 and the cam handle 31 is then turned, rotating the cam 29, and rocking the lever 26. As the lever rocks, its ends enter the slots of the lugs 28, and bear against the pins 27, so as to urge the free end of each shoe away from the pivoted end of the companion shoe, thus expanding or spreading apart the shoes within a tire or other object. After thus centering and clamping the work on the carrier, the collar 9 is rotated by its handle 10 to lower the sleeve 5, and permit the ball 12 to seat on the post 11, and thus take the load of the carrier and work. Ordinarily, when the machine is idle, the sleeve 5 is raised to receive the load, while elevating the ball somewhat above the post 11.

If the tire lacks balance, the carrier plate 15 will rock downwardly, pivoting on the ball 12 so that the level 18 may indicate the axis of maximum unbalance of the tire. The radial markings on the clamping shoes permit the reading of the level to be applied to the tire without guess work or loss of time and thus the part of the work requiring a weight correction is quickly and accurately located.

As shown in Fig. 5, the described oscillation damper located within the hollow base 1, is normally axially aligned with the vertical axis of the machine, and is hence equally effective to damp oscillations of the work carrier in any direction. Such oscillations are transmitted by the rod 41 from the carrier plate 15 to the damper, where they encounter a predetermined yielding resistance. When the level in container 43 falls sufficiently to uncover the outlet of the tube 46, oil discharges from the bottle 45 to restore such level.

When it is desired to remove the shoes from the carrier, said shoes may be abnormally actuated apart until the heads of bolts 34 register with the enlarged ends of the slots 33, it being then feasible to lift the shoes clear of their pivot pins.

After a casing has been balanced, it is usually necessary to again balance such casing in assembly with an inner air tube to ascertain if the valve stem of such tube will overcome the ascertained unbalance of the casing. Thus, when operating on an assembled tire and tube, the stem of the tube is held from rotation during rotative adjustment of the casing.

It is an important feature of the described clamping means that its operation involves no disturbance of the normal universally balanced condition of the work carrier.

The invention is presented as including all such modifications and changes as come within the scope of the following claims.

What I claim is:

1. In a work carrier for a balancing machine, a pivoted supporting member, a pair of work clamping shoes, pins upstanding from the supporting member and pivoting the shoes for actuation to and from each other, said shoes having slots, elongated in the direction of pivotal travel of the shoes, anchorage pins carried by the supporting member and upstanding through said slots and headed above the shoes to retain the shoes in normal engagement with their pivot pins, said slots having enlarged end portions registrable with the heads of the anchorage pins upon an abnormal outward travel of the shoes, to afford a removal of the shoes from their pivot pins, and a common means for actuating the shoes outwardly.

2. In a tire carrier for a balancing machine, a pivoted supporting member, a pair of substantially semi-circular tire-clamping shoes pivoted on said supporting member for movement to and from each other, said shoes having flanges on their outer faces for supporting the lower shoe of a pneumatic tire, and said supporting member projecting outwardly beyond the paired shoes for further supporting a tire, and a common means for actuating said shoes outwardly.

3. In a tire carrier for a balancing machine, a universally pivoted supporting member, a pair of shoes mounted on the supporting member for clamping a tire on said member, and means on the tire carrier for actuating said shoes from each other, said shoes having flanges on their tire-engaging faces to support the lower shoe of a pneumatic tire, and said supporting member projecting outwardly beyond the shoes to further support a tire.

4. In a work carrier for a balancing machine, a universally pivoted supporting member, a universal level mounted on said supporting member and centered at the vertical pivotal axis of said member, a pair of substantially arcuate shoes mounted on the supporting member at opposite sides of its vertical pivotal axis, and outwardly movable on the supporting member to center the arcs formed by said shoes at such axis, and actuating means for said shoes, the universal level having radial markings to identify a radius of unbalance of the level, and aligned markings being provided on said shoes.

5. In a work carrier for a balancing machine, a universally pivoted work supporting member, a universal level mounted on such supporting member and having radial markings to indicate the axis of unbalance of work mounted on said member, a set of work clamping shoes mounted on said supporting member and outwardly movable from its vertical pivotal axis to clamp the work and center it with respect to said axis, and actuating means for said shoes, the shoes having markings corresponding to the radial markings of the level aligned with such level markings when the shoes are in work-engaging position, whereby the readings of the level are readily applicable to the work.

6. In a work carrier for a balancing machine, a pivoted supporting member, a pair of work clamping shoes, means pivoting the shoes on the supporting member for actuation to and from each other, said shoes having slots, elongated in the direction of pivotal travel of the shoes, anchorage pins carried by the supporting member and upstanding through said slots and headed above the shoes to retain the shoes in normal engagement with their pivot pins, said slots having enlarged end portions registrable with the heads of the anchorage pins upon an abnormal outward travel of the shoes, to afford a removal of the shoes from the supporting member, and a common means for actuating the shoes outwardly.

7. In a work carrier for a balancing machine, a pivoted supporting member, a work clamping member, means pivoting the clamping member on the supporting member for actuation to and from its clamping position, means on the supporting member for actuating the clamping member, and an anchorage pin carried by one of said members, the other of said members having a slot to accommodate such pin, the slot being elongated to afford the clamping member its pivotal movement, and said pin being headed to normally retain said members in operative assembly, the slot having an enlarged end portion registrable with the head of the anchorage pin upon actuation of the clamping member beyond its normal clamping position to afford a disassembly of said members.

8. In a work carrier for a balancing machine, a pivoted supporting member, a pair of substantially arcuate work-clamping shoes carried in a complementary relation by the supporting member, means pivoting such shoes at opposite ends thereof upon the supporting member, a lever pivoted substantially midway of its length on the supporting member to turn about the vertical axis at which said member is universally pivoted, pins carried by the free ends of the shoes for engagement by said lever, and means for rotatively urging the lever against said pins to spread the shoes apart to a work-engaging position.

9. A work carrier for a balancing machine as set forth in claim 8, the free ends of the shoes being slotted to afford the lever engagement with said pins between the pin extremities.

10. In a work carrier for a balancing machine, a pivoted supporting member, a pair of work clamping shoes, means pivoting the shoes removably on the supporting member for actuation to and from each other, means yieldably retracting the shoes inwardly, means for actuating the shoes outwardly, in common, and means retaining the shoes in their operative relation to the support in normal travel of the shoes, such means affording the shoes removal from the support, upon a predetermined abnormal outward actuation of the shoes.

11. In a work carrier for a balancing machine, a work-supporting member, a hub rigidly and centrally connected to the work-supporting member, means within said hub for universally pivoting the work-supporting member, and means for clamping work on the supporting member including a lever pivoted on said hub above such member.

12. In a work carrier for a balancing machine, as set forth in claim 11, a pedestal secured on the hub, above said lever and retaining the lever in pivotal engagement with the hub, and a universal lever surmounting the pedestal.

13. In a work carrier for balancing machines, a pivoted supporting member, a pair of substantially semicircular work-centering shoes carried in a complementary relation by the supporting member, means pivoting said shoes at opposite ends thereof on the supporting member, a lever effective on both shoes to engage them with the work, and an actuating element for the lever operatively mounted on the supporting member and effective on the lever to secure the shoes in their work-centering position.

14. In a work carrier for a balancing machine, a pivoted supporting member, a pair of work clamping shoes, means pivoting the shoes removably on the supporting member for actuation to and from each other, means for actuating the shoes outwardly, in common, and means retaining the shoes in their operative relation to the support in normal travel of the shoes, such means affording the shoes removal from the support, upon a predetermined abnormal outward actuation of the shoes.

JOSEPH P. LANNEN.

CERTIFICATE OF CORRECTION.

Patent No. 2,199,667.  May 7, 1940.

JOSEPH P. LANNEN.

It is hereby certified that error appears in the printed specification of the above numbered patent requiring correction as follows: Page 3, second column, line 47, claim 12, for the word "lever" read --level--; and that the said Letters Patent should be read with this correction therein that the same may conform to the record of the case in the Patent Office.

Signed and sealed this 2nd day of July, A. D. 1940.

(Seal)

Henry Van Arsdale,
Acting Commissioner of Patents.